(12) United States Patent
Smith

(10) Patent No.: US 6,189,312 B1
(45) Date of Patent: Feb. 20, 2001

(54) FUEL METERING ARRANGEMENT FOR A GAS TURBINE ENGINE

(75) Inventor: Trevor S. Smith, Sutton Coldfield (GB)

(73) Assignee: Lucas Industries plc (GB)

( * ) Notice: Under 35 U.S.C. 154(b), the term of this patent shall be extended for 0 days.

(21) Appl. No.: 09/113,697

(22) Filed: Jul. 10, 1998

(30) Foreign Application Priority Data

Jul. 12, 1997 (GB) .................................................. 9714645

(51) Int. Cl.$^7$ ...................................................... F02C 9/28
(52) U.S. Cl. ................................ 60/39.281; 137/599.01; 137/110; 137/115.09
(58) Field of Search ................... 60/39.281; 137/599.08, 137/599.01, 110, 115.01, 115.09

(56) References Cited

U.S. PATENT DOCUMENTS

| | | | |
|---|---|---|---|
| 4,175,383 | * | 11/1979 | Smith ................................ 60/39.281 |
| 4,716,723 | * | 1/1988 | Ralston et al. ..................... 60/39.281 |
| 5,513,493 | * | 5/1996 | Severn et al. ..................... 60/39.281 |
| 5,709,079 | * | 1/1998 | Smith ................................ 60/39.281 |
| 5,896,737 | * | 4/1999 | Dyer ................................. 60/39.281 |

FOREIGN PATENT DOCUMENTS

| | | |
|---|---|---|
| 0 436 513 A1 | 7/1991 | (EP) . |
| 0 481 620 A1 | 4/1992 | (EP) . |
| 0 761 948 A2 | 3/1997 | (EP) . |
| 2 300 451 | 11/1996 | (GB) . |

* cited by examiner

*Primary Examiner*—Charles G. Freay
(74) *Attorney, Agent, or Firm*—Andrus, Sceales, Starke & Sawall

(57) ABSTRACT

A fuel metering arrangement has a fuel flow metering valve, a pressure drop regulator valve arranged and operable to maintain the pressure drop across the metering valve substantially constant and a throttle device arranged and operable to regulate fuel flow upon failure of the regulator valve in an insufficiently closed or fully open position.

8 Claims, 1 Drawing Sheet

FUEL METERING ARRANGEMENT FOR A GAS TURBINE ENGINE

BACKGROUND OF THE INVENTION

The present invention relates to a fuel metering arrangement for a gas turbine engine, such as a jet engine, primarily for use in aircraft.

It is conventional practice to meter the fuel flow to a gas turbine engine by the use of a metering valve having a metering orifice of which the area is variable according to fuel demand, usually under the control of a closed loop servo-system. It is important to maintain the pressure drop across the metering valve substantially constant and this is commonly achieved by connecting a pressure drop regulator valve between the inlet and outlet sides of the metering valve.

SUMMARY OF THE INVENTION

An object of the invention is to provide a fuel metering arrangement employing a metering valve controlled by a pressure drop regulator valve, in which protection is provided against at least downward failure of the pressure drop regulator valve.

According to the invention, a fuel metering arrangement comprises a fuel flow metering valve, a pressure drop regulator valve arranged and operable to maintain the pressure drop across the metering valve substantially constant, and a throttle device arranged and operable to regulate fuel flow upon failure of the regulator valve in an insufficiently closed or fully open position.

In one convenient arrangement, main and emergency pressure drop regulator valves are provided arranged in parallel, the emergency regulator valve operating to regulate fuel flow upon failure of the main regulator valve in an insufficiently open or fully closed position, the throttle device operating to regulate fuel flow upon failure of the main regulator valve in an insufficiently closed or fully open position.

The throttle device is preferably arranged in series with the main pressure drop regulator.

Preferably, the emergency pressure drop regulator is a spill valve arranged to respond to a pressure drop across the metering valve higher than that normally permitted by the main pressure drop regulator, and the throttle device is a throttle valve arranged to respond to a pressure drop across the metering valve lower than that normally permitted by the main regulator valve.

Typically, the spill valve is housed within the throttle valve and normally urged to a position in which it closes off an emergency spill orifice and the throttle valve is normally urged towards a fully open position.

In another convenient arrangement, two fuel flow metering valves are arranged in series and the main and emergency pressure drop regulators are arranged respectively upstream of the metering valves, the throttle device being connected between the main regulator valve and the upstream side of the first metering valve.

BRIEF DESCRIPTION OF THE DRAWINGS

The invention will now be described, by way of example, with reference to the accompanying drawings in which.

DETAILED DESCRIPTION OF THE PREFFERED EMBODIMENTS

Figure 1:
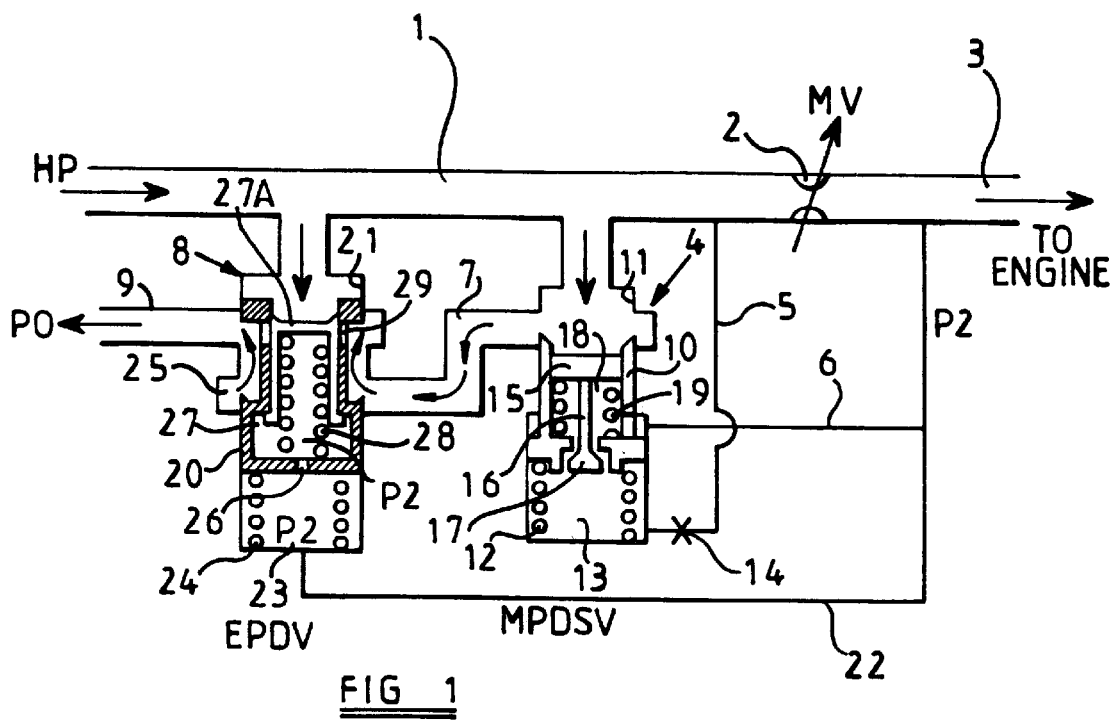
FIG. 1 is a diagrammatic representation of part of a first embodiment of the fuel metering arrangement of the invention.

In the system partially illustrated in FIG. 1, fuel is supplied at high pressure along a main fuel supply line 1 to a metering valve (MV) 2 having, for example, a variable area metering orifice through which a metered fuel flow enters an engine supply line 3. A main pressure drop spill valve (MPDSV) 4 has control lines 5 and 6 connected respectively to the inlet and outlet sides of the metering valve 2 and in particular across the variable area metering orifice of this valve. An output line 7 of the valve 4 is connected to an emergency pressure drop valve (EPDV) 8, of which an output line 9 is connected to a low pressure area.

The main pressure drop spill valve 4 has a control element 10 slidable in a bore 11 and arranged so that varying the position of the element 10 along the bore modifies the flow of fuel between the high pressure line 1 and output line 7. The element 10 is urged towards its closed position by a spring 12 contained within a chamber 13 and acting to close the valve 4 when high pressure is not present in the line 1. The underside of the element 10 is subject to a servo-pressure in the chamber 13 from the upstream side of the metering valve via the line 5 incorporating a restrictor 14. A piston 15 is slidable within the control element 10 and is connected by a stem 16 to a valve head 17 which controls an orifice in the element 10 between the chamber 13 and a chamber 18 formed beneath the piston 15 and supplied via the line 6 from the downstream side of the metering valve 2. The piston 15 can therefore be seen to be responsive to a difference between the high pressure in line 1, upstream of the metering valve, applied to its upper side and the aforesaid pressure in line 6 applied to its opposite side. A further spring 19 acting between the element 10 and underside of the piston 15 biases the piston against the resultant of these pressures.

The valve 4 is set up so that, for the required pressure difference across the metering valve 2, the valve 17 is in a position in which the servo flow through the valve 17 balances the flow through the orifice 14 and the piston 10 is therefore in a steady state position. An increase in the aforesaid pressure difference has the effect of moving the piston 15 downwardly which, in turn, opens the valve 17 to increase the servo flow out of the chamber 13, thereby reducing the servo-pressure in the chamber 13. The control element 10 then moves downwardly to increase the spill flow through the outlet 7. When the aforesaid pressure difference is re-stablished at the correct value, the valve 4 returns to a balanced condition with the flow through the valve 17 equal to the flow through the orifice 14. The valve 4 thus continually responds to pressure difference across the metering valve 2 and maintains that pressure difference substantially constant by varying fuel spill through the line 7, as required.

The emergency pressure drop valve 8 is a combined spill valve and throttle valve providing protection against both upward and downward failure of the main pressure drop spill valve. This valve 8 has a throttle valve element 20 slidable in a bore 21 and subject at its upper end to high pressure fuel flowing in the line 1 and at its lower end, via a line 22 connected to a chamber 23 beneath the element 20, to the pressure at the downstream side of the metering valve 2. A spring 24 urges the element 20 in a direction opposed to the high pressure, tending to close a throttle profile 25 to which the line 7 from the main pressure drop spill valve is connected. The chamber 23 communicates via a port 26 in the base of the throttle element 20 with a further chamber 27 within which is slidably mounted a spill valve element 27A normally urged by a spring 28 to a position in which it fully closes a spill profile 29. The springs are selected to ensure that, under normal operating conditions, i.e. with the main pressure drop spill valve 4 controlling the pressure drop across the metering valve 2 to the required value, the emergency pressure drop valve is in the illustrated condition with the spill valve profile 29 fully closed and the throttle valve profile 25 fully open. In this condition, the emergency pressure drop valve permits spill from the line 7 to pass through the throttle profile 25 and along the outside of the throttle element 20 into the low pressure line 9.

In the event that the main pressure drop spill valve fails in an insufficiently open or a closed position, i.e. in a condition such that inadequate spill or no spill is able to take place along the line 7, the increasing high pressure from line 1 applied to the emergency pressure drop valve 8 displaces the spill element against the action of the spring 28 to open the spill profile 29, enabling fuel to spill through this profile and thereby correct the excessive pressure drop. Conversely, if the main pressure drop spill valve fails insufficiently closed or open, i.e. so that excessive spill takes place through the line 7, the then decreasing pressure in line 1 enables the spring 24 to move the throttle element 20 to decrease the throttle profile 25, thereby limiting the downward pressure failure.

Thus, the emergency pressure drop valve 8 provides automatic protection against upward and downward failure of the main pressure drop spill valve 4.

The emergency pressure drop valve 8 is configured so that the pressure difference across the metering valve required to open the emergency spill profile 29 is sufficiently high to prevent this profile opening during normal operation. Similarly, the pressure difference required to close the emergency throttle profile 25 is sufficiently low to prevent this profile from closing during normal operation. Although large step pressure changes, such as fuel dip, are likely to result in the emergency spill profile partially opening and the throttle profile partially closing, these emergency profiles would normally only be operative for a very small proportion of the total operating time and therefore would be unlikely to seize in a position to cause upward or downward failure. The main spill valve does not therefore have to be designed to compensate for such failures and therefore the emergency pressure drop valve can be designed to compensate fully for failures of the main spill valve whether it be fully open or fully shut.

Figure 2:
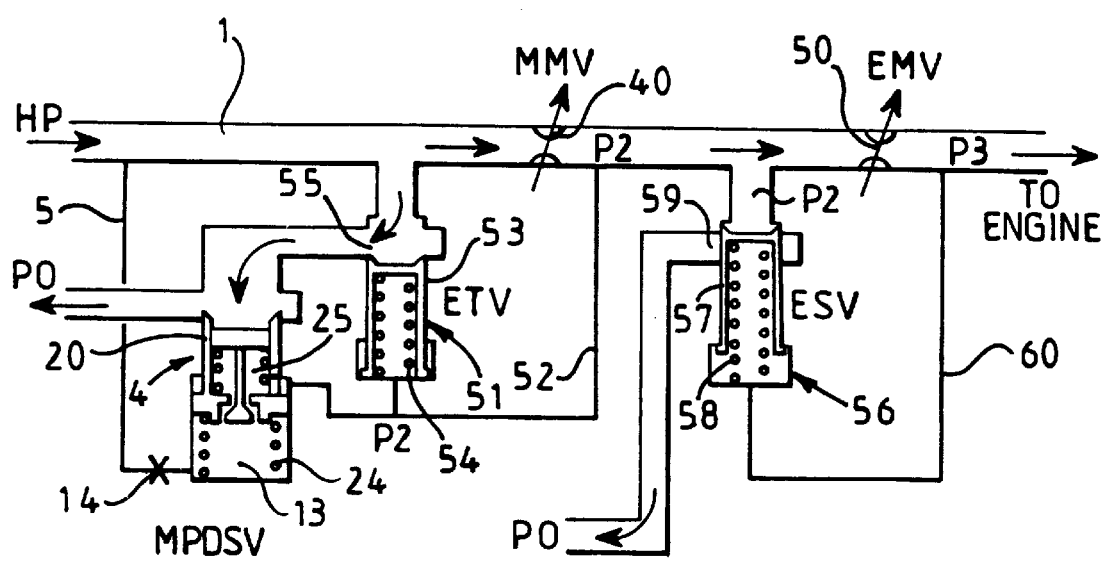
FIG. 2 is a view similar to FIG. 1, illustrating an alternative embodiment.

FIG. 2, in which like references from FIG. 1 are employed for like components, illustrates an alternative form of the arrangement of the invention used to control a pair of metering valves, being a main metering valve (MMV) 40 and an emergency metering valve (EMV) 50 arranged in series. These valves may conveniently be arranged in a "lowest wins" configuration, as described in our published application EP 0761948, which provides automatic protection against upward failure of either valve. A main pressure drop spill valve 4 (MPDSP), identical with the valve 4 of FIG. 1, has its chamber 13 connected to the high pressure line 1 at the upstream side of the main metering valve 40, by a line 5 and restrictor 14. In this embodiment, the composite emergency pressure drop valve 8 of FIG. 1 is replaced by individual emergency valves, one of which is an emergency throttle valve 51 arranged between the high pressure line 1 upstream of the main metering valve 40 and a line 52 connected to line 1 downstream of the valve 40. A branch of the line 52 is also connected to the chamber 25 of the valve 4. The emergency throttle valve 51 has a throttle element 53 slidable therein and urged by a spring 54 towards a position in which it closes a throttle profile 55.

An emergency spill valve 56 is connected to the high pressure line 1 between the main and emergency metering valves 40, 50. This valve has a spill valve element 57 slidable therein and normally urged by a spring 58 into a position in which it closes an emergency spill profile 59. The element 57 is subjected at one side thereof to a pressure P2 prevailing downstream of the main metering valve and, at its other side, via a line 60, to a pressure P3 prevailing at a location downstream of the emergency metering valve 50.

The emergency metering valve is controlled so as to permit a higher flow, typically 20% higher, than the main metering valve and the pressure drop across the emergency valve is therefore normally lower than the nominal value set by the emergency spill valve 56. The valve 56 therefore normally remains closed and the pressure in line 1 producing the pressure difference across the main metering valve 40 is sufficiently high to depress the valve element 53 of the emergency throttle valve 51 against the spring 24 to open fully the throttle profile 55, as illustrated. This allows the pressure drop across the main metering valve 40 to be controlled by the main pressure drop spill valve 4, in the manner described in relation to FIG. 1. Should the main pressure drop spill valve fail in its closed or an insufficiently open position, the resulting increased flow and pressure rise in the line 1 causes the emergency spill valve 56 to open against the action of the spring 58 to permit spill through the emergency spill profile 59, limiting upward failure to +20% flow. Downward failure, due to the main pressure drop spill valve failing in its open or an insufficiently closed position, is dealt with by the emergency throttle valve 51 which, as mentioned above, is set so that it is normally held fully open by the high pressure in line 1. The aforesaid failure of the main pressure drop spill valve, resulting in excessive spill from the line 1, will permit the spring 54 partially to close the throttle profile 55 which subsequently acts to control spill in place of the failed main pressure drop spill valve.

The arrangement in FIG. 2 provides automatic protection against upward and downward failure of the main pressure drop spill valve 4. Upward failure of the emergency spill valve 56 will not happen, since this valve is normally closed, which means that downward failure of this valve is also unlikely and no protection measure for this is necessary. It would be possible to improve the accuracy of the emergency metering valve by replacing the direct acting emergency spill valve 56 with a servoed device similar to the main pressure drop spill valve, although this is likely to lead to weight and cost penalties.

What is claimed is:

1. A fuel metering arrangement, for a gas turbine engine, having a pressurized fuel supply line including a fuel flow metering valve, a pressure drop regulator valve receiving control signals by way of first and second control lines communicating with said fuel supply line at points upstream and downstream, respectively, of said metering valve and operable in response to the pressures in said supply line upstream and downstream, respectively, of said metering valve to maintain the pressure drop across the metering valve substantially constant by controlling the flow of fuel in a spill line from said supply line upstream of said metering valve to a low pressure fuel line, and a throttle device in said spill line and responsive to the pressure in said supply line to regulate fuel flow in said supply line upon failure of the regulator valve in an insufficiently closed or fully open position.

2. A fuel metering arrangement according to claim 1, wherein said pressure drop regulator valve is a main pressure drop regulator valve and an emergency pressure drop regulator valve is provided arranged in parallel with said main valve between said supply line and said low pressure fuel line, the emergency regulator valve operating to regulate fuel flow from said supply line to said low pressure line upon failure of the main regulator valve in an insufficiently open or fully closed position.

3. A fuel metering arrangement according to claim 1, wherein the throttle device is arranged in series with the main pressure drop regulator.

4. A fuel metering arrangement according to claim 3, wherein the emergency pressure drop regulator comprises a spill valve including means for responding to a pressure drop across the metering valve higher than that normally permitted by the main pressure drop regulator and the throttle device comprises a throttle valve including means for responding to a pressure drop across the metering valve lower than that normally permitted by the main regulator valve.

5. A fuel metering arrangement according to claim 4, wherein the spill valve is housed within the throttle valve and includes means for biasing said spill valve to a position in which it closes off an emergency spill orifice and the throttle valve includes means for biasing said throttle valve towards a fully open position.

6. A fuel metering arrangement according to claim 2, wherein the main pressure drop regulator is connected across the fuel flow metering valve.

7. A fuel metering arrangement according to claim 2, wherein the emergency pressure drop valve is a combined spill valve and throttle valve.

8. A fuel metering arrangement according to claim 2, wherein said fluid flow metering valve is a first fluid flow metering valve and there is provided a second fluid flow metering valve, said first and second fluid flow metering valves being arranged in series and the main and emergency pressure drop regulators being arranged respectively upstream of said first and second metering valves, the throttle device being connected between the main regulator valve and the upstream side of the first metering valve.

* * * * *